Nov. 14, 1950          A. W. GUSTAFSON          2,529,605
LIQUID REGULATING ASSEMBLY IN A SPRAY NOZZLE SYSTEM
Filed March 8, 1948          2 Sheets—Sheet 1
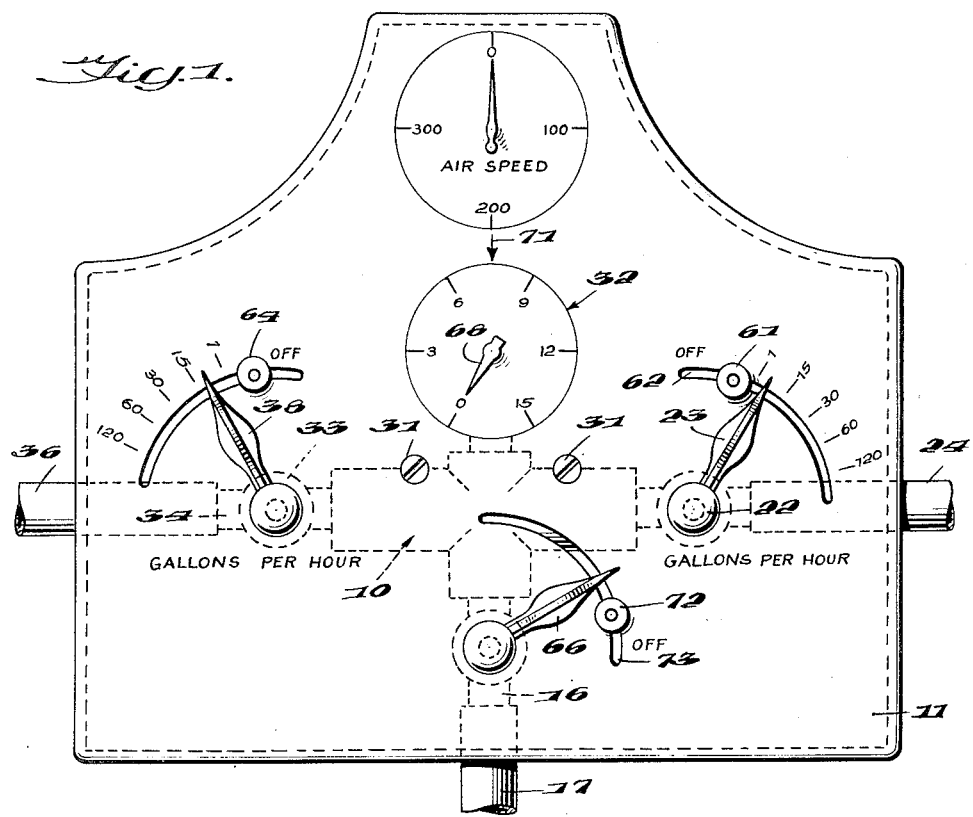
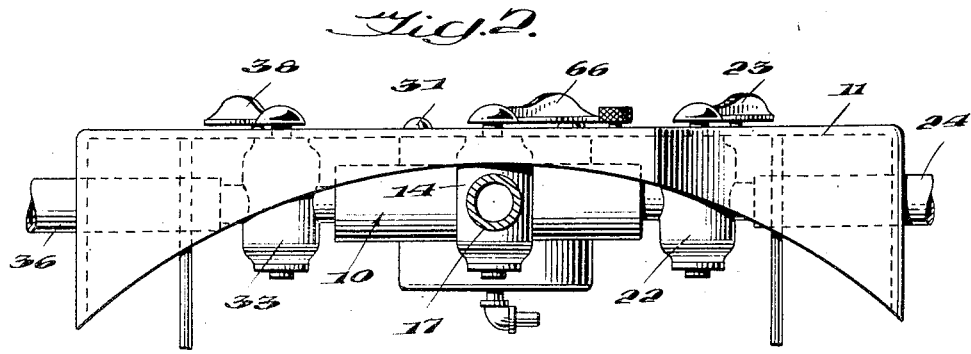
Inventor
AUGUST W. GUSTAFSON,
By Robert E. Barry
Attorney

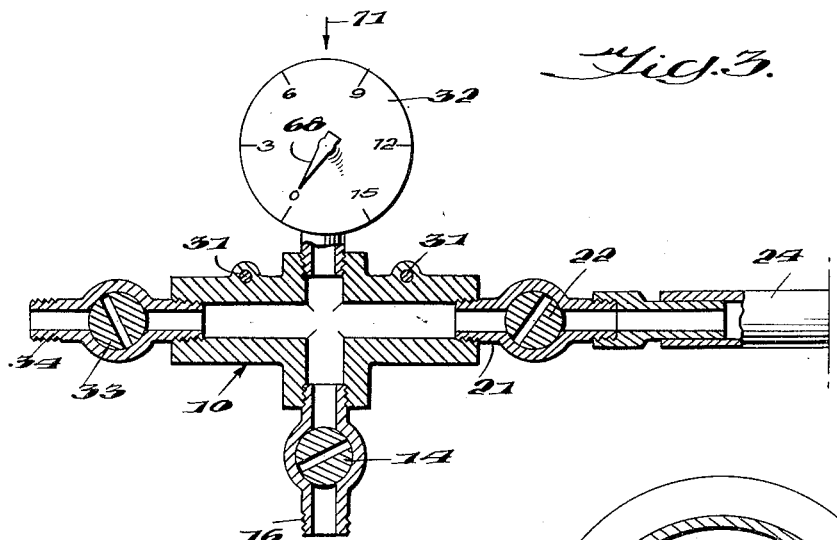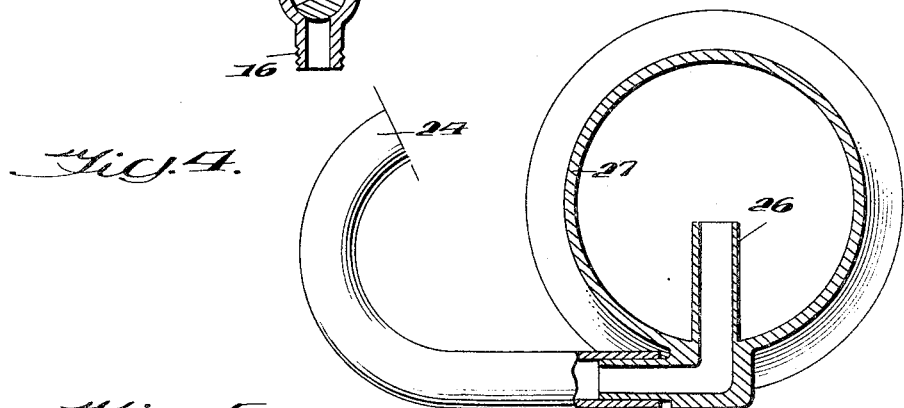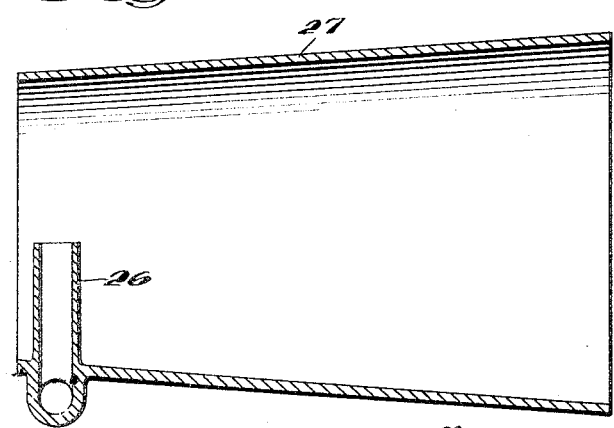

Patented Nov. 14, 1950

2,529,605

UNITED STATES PATENT OFFICE 2,529,605

LIQUID REGULATING ASSEMBLY IN A SPRAY NOZZLE SYSTEM

August W. Gustafson, Corpus Christi, Tex.

Application March 8, 1948, Serial No. 13,722

3 Claims. (Cl. 299—58)

1

The present invention relates to apparatus for controlling the supply of liquid under pressure to an insecticide distributor of the type wherein liquid and air are supplied to the distributor nozzle.

An object of the invention is to provide a compact assembly for convenient manipulation for regulating the flow of liquid to the nozzle of an insecticide distributor so that uniform quantities of liquid may be supplied to each nozzle and the operator may be made aware of any departure from a given volume being supplied to a nozzle.

A more specific object of the invention resides in providing an instrument panel with a gauge for indicating the pressure under which liquid is being supplied to a distributor nozzle including valves controlled from a position on the instrument panel for adjusting the flow of liquid and for clearing any obstructions in the supply lines.

Other objects of the invention will be more apparent as the present disclosure proceeds and upon consideration of the following detailed description and the accompanying drawings wherein an exemplary embodiment of the invention is disclosed.

In the drawings:

Fig. 1 is a front elevational view of an instrument panel showing fluid regulating means embodying the invention in association therewith.

Fig. 2 is a plan view of the apparatus shown in Fig. 1.

Fig. 3 is a sectional view of the liquid distributing device.

Fig. 4 is a transverse sectional view of the nozzle.

Fig. 5 is a longitudinal sectional view of the nozzle.

The present invention is directed to a regulator for liquids which are supplied to the nozzle or nozzles of an insecticide distributing machine wherein liquid under relatively low pressure is supplied to a distributor nozzle along with high velocity air. The apparatus is designed for mounting on an instrument panel for a vehicle carrying the insecticide distributing mechanism so that the flow of liquid to the nozzles may be controlled by the operator of the vehicle and the operation of the fluid control means may be observed along with other dials of the vehicle.

Referring to the drawings, a T-shaped pipe fitting 10 is mounted in the back of an instrument panel shown at 11 in Figs. 1 and 2. The instrument panel 11 may take any desired shape and may be of the type for use in connection with other instruments on board a vehicle such

2 as a tractor. The T-shaped fitting 10 is provided with a valve 14 through which liquid is supplied under pressure. Any suitable means may be provided for supplying liquid under pressure to the nipple 16 which may be coupled to the supply source by means of a hose or pipe 17, as shown in Fig. 1.

The chamber of the fitting 10 is in open communication with a pipe fitting 21 and this assembly includes a valve 22. The valve 22 is adapted to be controlled from a position at the front of the instrument panel 11 by means of a handle 23 which is so shaped as to serve as an index pointer in association with a scale carried by the front of the instrument panel. A hose or other suitable conduit 24 extends from the valve 22 to the nozzle 26 of the insecticide distributor. The liquid nozzle 26 is mounted in an air nozzle 27 as illustrated in Figs. 4 and 5. The nozzle 26 may vary in inside diameter and is preferably made choke-proof by maintaining the internal diameter thereof larger than the cross sectional dimensions of the valve 22, or the valve 14.

The pipe fitting 10 may be secured to the back of the instrument panel 11 by means of a plurality of bolts or screws 31. This mounting of the pipe fitting 10 arranges the liquid distributing valves in positions in back of the instrument panel. The arrangement includes a pressure gauge 32 in opening communication with the pipe fitting 10 and this pressure gauge is provided with a dial which forms a part of the front face of the instrument panel 11.

The other leg of the pipe fitting 10 is also provided with a valve 33 and a suitable fitting 34 whereby a hose or other conduit 36 may extend to a second insecticide distributing nozzle. The valve 33 is employed for controlling the movement of liquid to the second insecticide distributing nozzle. This valve 33 is controlled by a lever 38 at the front of the instrument panel which also serves as an index pointer in association with a scale carried by the face of the instrument panel.

In operation, the device is designed for use in connection with a liquid and dust insecticide distributor in which liquid under relatively low pressure is supplied through the hose 17 and in which air at relatively high velocity is supplied to the nozzles 27. In order to initiate movement of liquid to the nozzle 26, the lever 23 is first set so as to indicate the required number of gallons per hour of liquid to be distributed through the conduit 24. The movement of this lever 23 adjusts the position of the valve 22 and the lever 23 may be set at seven and one-half gallons as shown in Fig. 1. Thereafter, a stop member 61 is moved in an arcuate-shaped slot 62 of the instrument panel against the pointer end of the lever 23. The thumb nut of the stop member 61 is then tightened so as to hold the lever 23 in the position illustrated in Fig. 1. If it is desired to use only one nozzle, the lever 38 is set in the Off position whereby the valve 33 remains closed. If liquid is to be supplied through the conduit 36 to another distributor nozzle, the lever 38 may be set so that the index portion thereof designates the desired number of gallons per hour which is to be supplied to the nozzle at the left of the vehicle. A stop device 64 may then be set in a manner similar to that described in connection with the lever 23.

After the lever 23 has been adjusted as above described, the lever 66 in association with the valve 14 is then advanced so as to open the valve 14. This valve 14 is opened to such an extent that the pressure of the liquid passing into the pipe fitting 10 moves the pointer 68 of the gauge 32 to position in radial alignment with the arrows 71. When the pressure indicated by the gauge 32 reaches the point 71, the lever 68 is set by moving a stop member 72 against the lever and tightening the thumb nut thereof. This stop member 72 moves in an arcuate-shaped groove 73 and the stop member may be fixed in any desired position along the path of the index portion of the lever 66. After these adjustments have been completed, liquid will be exhausted through the nozzle 26 at the rate of the number of gallons per hour as indicated by the adjustment of the lever 23. Accordingly, the number of gallons per hour of liquid distributed from either one or both of the nozzles can be determined and provided for as desired.

In the event that the supply of liquid under pressure passing into the fitting 10 is diminished by reason of choking upstream with respect to valve 14, the indicated pressure on the gauge 32 will fall below the point indicated at 71. If there is any choking or clogging in the distribution lines or in the conduit 24 beyond the valve 22, or the valve 33, this difficulty will be indicated by an increased pressure on the gauge 32 which will cause the pointer 68 to advance beyond the point 71. If there is a lowering of the pressure as indicated by the gauge 32, this choking may be corrected by advancing the lever 66 to the full open position and maintaining the lever in this position of the valve 14 until the pointer 68 returns to the point 71. Thereafter, the lever 66 is returned to a position engaging the stop member 72. Should the pressure again fall and be indicated on the gauge, repeated openings of the valve 14 will provide for the clogging of the supply line to be removed so that the operation can again be restored to a normal condition. If choking occurs beyond the valve 22 there will be an indicated rise in pressure on the gauge 32. Such choking tendencies may be corrected by advancing the lever 23 to open the valve 22 to a full open position. Thereafter, as the clogging is removed, the lever 23 may be returned to a position engaging the stop member 61.

While the invention has been described with reference to specific structural features in connection with one general organization of the control valves on an instrument panel, changes may be made in the various elements and in the general arrangement. Such modifications may be made without departing from the spirit and scope of the invention, as set forth in the appended claims.

What I claim and desire to secure by Letters Patent is:

1. Liquid control means for an insecticide distributor nozzle comprising, an instrument panel, means providing a chamber mounted in back of said instrument panel, a pressure gauge in association with said chamber mounted with a dial thereof visible from the front of said instrument panel, conduit means for supplying liquid under pressure into said chamber, a valve in said conduit means, a lever at the front of said instrument panel actuating said valve, movable stop means carried by the instrument panel for arresting movement of said lever to a closed position of said valve, conduit means extending from said chamber to a distributor nozzle, a valve in the last-mentioned conduit means, a lever actuating the second valve arranged in front of said instrument panel, and means for arresting the movement of the second lever to a closed position of the second valve, and means associated with said gauge indicating a normal pressure within said chamber.

2. In apparatus for controlling the movement of liquid under pressure to a distributor nozzle, a T-shaped pipe fitting, conduit means leading from a source of liquid under pressure into said fitting, an adjustable valve in said conduit means, conduit means leading from said fitting to a nozzle, an adjustable valve in the second conduit means, a pressure gauge in open communication with said fitting, a dial on said gauge, a panel, means securing the fitting to said panel, said panel having an opening through which the dial of the pressure gauge may be observed from a position at the front of the panel, means indicating a normal pressure in said fitting, a lever at the front of the panel for operating the first valve, a stop member mounted on the panel adapted to be fixed in different positions in the path of movement of said lever to arrest movement thereof towards a position closing the first valve, a second lever at the front of the panel terminating in a pointer and actuating the second valve, an index scale carried by the panel adjacent the path of movement of said pointer, said panel having a slot therein concentric with the path of movement of the pointer, and a stop member movable in said slot adapted to be fixed in positions for preventing movement of the second lever to a position closing the second valve.

3. In apparatus for controlling the movement of liquid under pressure to a distributor nozzle, a T-shaped pipe fitting, conduit means leading from a source of liquid under pressure into said fitting, an adjustable valve in said conduit means, and carried by the fitting, conduit means leading from the fitting to a distributor nozzle, an adjustable valve in the second conduit means carried by said fitting, a pressure indicating device in open communication with the fitting and supported thereby, a panel having an opening therein, means securing the fitting to the panel with the indicating device visible through said opening in the panel, an index on the front of the panel cooperating with the pressure indicating device for showing a normal pressure within the fitting, a lever at the front of the panel for actuating the first valve, an adjustable stop member carried by the panel adapted to be fixed in positions for arresting movement of the lever to a position closing the first valve, a second lever mounted at the front of the panel terminating in a pointer and actuating the second valve, a scale carried by the front of the panel cooperating with the pointer, and an adjustable stop member mounted on the panel in the path of movement of the second lever adapted to be fixed in various positions arresting movement of the second lever to a position closing the second valve.

AUGUST W. GUSTAFSON.

REFERENCES CITED

The following references are of record in the file of this patent:

UNITED STATES PATENTS

| Number | Name | Date |
| --- | --- | --- |
| 1,114,126 | Drager | Oct. 20, 1914 |
| 1,763,305 | Heidbrink | June 10, 1930 |
| 1,766,622 | Frey | June 24, 1930 |
| 1,782,054 | Uhl | Nov. 18, 1930 |
| 2,069,150 | Holder | Jan. 26, 1937 |
| 2,166,414 | Kuenhold | July 18, 1939 |